(12) United States Patent
Jarvinen et al.

(10) Patent No.: US 10,619,619 B2
(45) Date of Patent: Apr. 14, 2020

(54) ARRANGEMENT IN A WAVE ENERGY RECOVERY APPARATUS AND METHOD FOR OPERATING A WAVE ENERGY RECOVERY APPARATUS

(71) Applicant: AW-ENERGY OY, Vantaa (FI)

(72) Inventors: Arvo Jarvinen, Vantaa (FI); Christopher Ridgewell, Helsinki (FI)

(73) Assignee: AW-ENERGY OY, Vantaa (FI)

( * ) Notice: Subject to any disclaimer, the term of this patent is extended or adjusted under 35 U.S.C. 154(b) by 0 days.

(21) Appl. No.: 16/091,871

(22) PCT Filed: Apr. 8, 2016

(86) PCT No.: PCT/FI2016/050222
§ 371 (c)(1),
(2) Date: Oct. 5, 2018

(87) PCT Pub. No.: WO2017/174858
PCT Pub. Date: Oct. 12, 2017

(65) Prior Publication Data
US 2019/0128238 A1 May 2, 2019

(51) Int. Cl.
F03B 13/18 (2006.01)
E02B 9/08 (2006.01)

(52) U.S. Cl.
CPC ............ *F03B 13/182* (2013.01); *E02B 9/08* (2013.01); *F05B 2240/97* (2013.01); *F05B 2250/02* (2013.01); *Y02E 10/38* (2013.01)

(58) Field of Classification Search
CPC ..................... F03B 13/181; F03B 13/182
See application file for complete search history.

(56) References Cited

U.S. PATENT DOCUMENTS 9,109,570 B2 * 8/2015 Jarvinen ............... F03B 13/182
9,551,125 B2 * 1/2017 Koivusaari .......... F03B 13/182
9,752,551 B2 * 9/2017 Jarvinen ............... F03B 13/182
(Continued)

FOREIGN PATENT DOCUMENTS

CN 102720627 A 10/2012
WO WO 2012/022824 A1 2/2012
(Continued)

OTHER PUBLICATIONS

Finnish Patent and Registration Office, International Search Report in International Application No. PCT/FI2016/050222 (dated Jul. 7, 2016).
(Continued)

*Primary Examiner* — Michael Leslie
(74) *Attorney, Agent, or Firm* — Neal, Gerber & Eisenberg LLP; Gregory Leighton; Daniel Organ

(57) ABSTRACT

This invention relates to an arrangement in a wave energy recovery apparatus and to a method for operating the wave energy recovery apparatus. The apparatus comprises at least a base (1), on which a reciprocating panel (2) is installed, a pivot shaft (7) for the reciprocating panel (2), a control system, and one or more power-take-off (PTO) units (3) to convert kinetic energy of waves or tidal currents to another type of energy. The arrangement comprises adjustment means (5, 5', 5") to set the top of the panel (2) in its vertical position to approximately correspond to the altitude of the surface (8) of the water.

18 Claims, 9 Drawing Sheets

(56) References Cited

Figure 1:
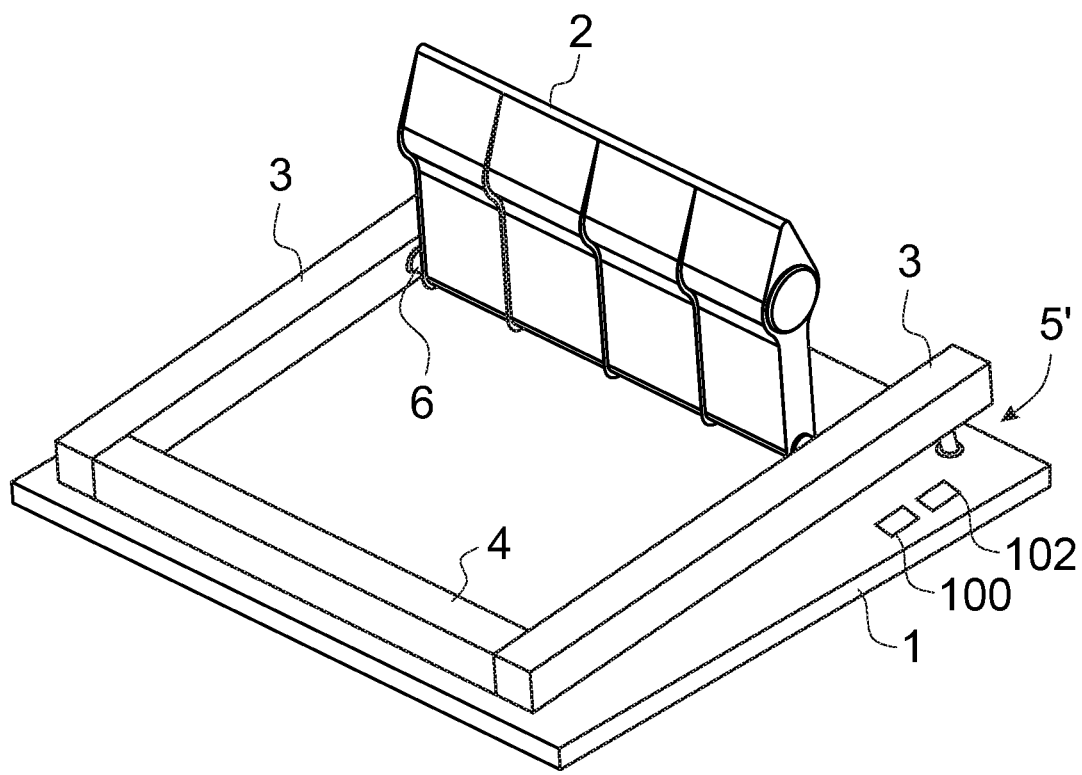

U.S. PATENT DOCUMENTS 10,151,293 B2* 12/2018 Pasanen ................ F03B 13/182
10,364,790 B2* 7/2019 Pasanen ................ F03B 13/182

FOREIGN PATENT DOCUMENTS

WO     WO 2012/022825 A1    2/2012
WO     WO 2015/193532 A1    12/2015

OTHER PUBLICATIONS

Finnish Patent and Registration Office, Written Opinion of the International Searching Authority in International Application No. PCT/FI2016/050222 (dated Jul. 7, 2016).
The International Bureau of WIPO, International Preliminary Report on Patentability in International Application No. PCT/FI2016/050222 (dated Oct. 9, 2018).

* cited by examiner

ARRANGEMENT IN A WAVE ENERGY RECOVERY APPARATUS AND METHOD FOR OPERATING A WAVE ENERGY RECOVERY APPARATUS

The present invention relates to an arrangement in a wave energy recovery apparatus as defined in the preamble of claim 1 and a method for operating a wave energy recovery apparatus as defined in the preamble of claim 14.

The wave energy recovery apparatus according to the invention is suited very well for instance to be used in connection with panels or flaps or essentially plate-like wing elements, later called shorter only as panels, hinged with its lower edge to make a reciprocating movement caused by wave energy or tidal energy of seawater as shown for example in the international patent publications No. WO03/036081 A1 and No. WO2011/121167 A1. The wave energy or tidal energy collected is further converted with a conversion unit for instance to electric energy, fresh water or hydrogen. For the sake of simplicity, only the term wave energy is later mentioned when both the wave energy and the tidal energy of seawater are meant.

According to prior art there are various types of wave energy recovery systems where the arrangements include a heavy base and, for instance, one or more panels pivotally connected to the base to make a reciprocating or oscillating motion about a rotation axis or pivot axis in response to wave forces or tidal forces as shown for example in the international patent publications No. WO9817911 A1, WO2004007953 A1 and WO2006100436 A1. All the solutions show a wave energy recovery arrangement where the reciprocating panel is hinged with its lower edge on a heavy base that is placed on the bottom of the seabed. In none of the solutions the height position of the reciprocating panel can be changed. That causes the problem that the arrangements according to prior art mentioned above can be installed only in limited depth areas of sea where the depth of water is suitable and does not change much during the variation of the tide. Another problem with the arrangements according to prior art mentioned above is the installation phase when the arrangement is to be installed at its production site onto the bottom of the sea. Correspondingly the servicing also causes problems because the arrangements according to prior art are difficult to lift to the surface of the water. Yet additional problems are uneven loading on bearings and difficulties on lining the bearings line at the opposite sides of the broad panel. Yet another problem is that typically prior art solutions are expensive and their structures are heavy.

The object of the present invention is to eliminate the drawbacks described above and to achieve a reliable, compact, economical and efficient arrangement in a wave energy conversion apparatus in order to be able to capture a maximum amount of available wave or tidal energy and which apparatus is easy to install and easy to take for service. Another object of the present invention is to add possible places of installation so that the arrangement can also be installed in deeper water than earlier and which arrangement can be easily arranged to follow the variation of the tide. Yet another object of the present invention is to achieve an arrangement where the water flow is easily controllable in all kind of sea conditions so that, for example, in stormy weather a part of the wave energy can be guided to pass the reciprocating panel and in still sea conditions as much wave energy as possible can be captured. Yet another object of the present invention is to achieve an arrangement where the connection between the power-take-off units (PTO) and panel is easy to perform with a separate shaft unit, and where the lining of the panel bearings is easy to fulfill so that the loading of panel bearings is as even as possible. The arrangement in a wave energy recovery apparatus according to the invention is characterized by what is presented in the characterization part of claim 1, and the method for operating a wave energy recovery apparatus according to the invention is characterized by what is presented in the characterization part of claim 14. Other embodiments of the invention are characterized by what is presented in the other claims.

The arrangement according to the invention comprises adjustment means to set the top of the reciprocating panel in its vertical position to follow the altitude of the surface of the water and to approximately correspond to the altitude of the surface of the water. Advantageously the arrangement additionally comprises monitoring means to watch the altitude of the surface of the water, which the monitoring means are connected at least to the adjustment means to make the top of the panel in its vertical position to follow the altitude of the surface of the water when the altitude varies between the low and high tide. In one preferable embodiment height position of the panel is adjusted by moving the panel and one end of each PTO unit substantially simultaneously upwards and downwards continuously and substantially in the same rhythm and into the same direction with the alteration of the surface of the water.

The solution according to the invention has a number of advantages. The solution makes it possible to affect to the field of water flow so that as much wave energy as possible can be captured in all kind of sea conditions. In that case, for example, in stormy sea conditions a part of the wave energy can be guided to pass the reciprocating panel and in still sea conditions as much wave energy as possible can be guided towards the reciprocating panel. Another advantage is a fast and easy possibility to install the arrangement in its production site onto the sea bottom. That reduces installation costs. Also servicing is easy and cost efficient to perform because the structure of the arrangement makes it possible to easily lift a part of the wave energy apparatus to the surface of the sea. Yet another advantage is a possibility to install the arrangement in its production site in deeper water than usually and the variation of the tide can still be effectively followed. In that way the arrangement of the invention makes it possible to increase the number of possible installation locations. Yet another advantage is that smaller loads are caused to the structure of the apparatus. In addition the loads are more even than in the most prior art solutions. Thanks to the smaller loads it is possible to use larger panels in the apparatus, and also power-take-off units can be installed at both sides of the panel. That means better capacity.

Figure 2:
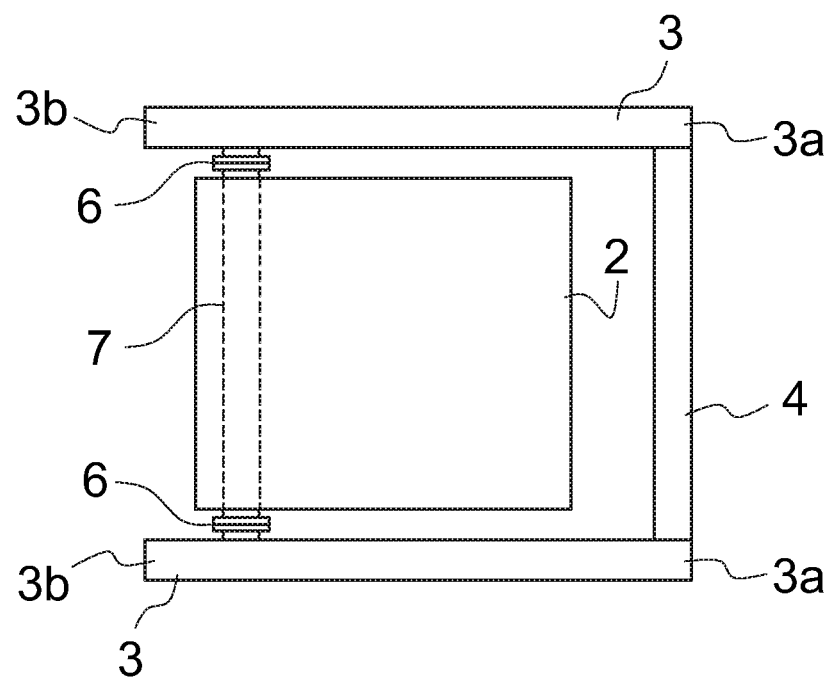
Figure 3:
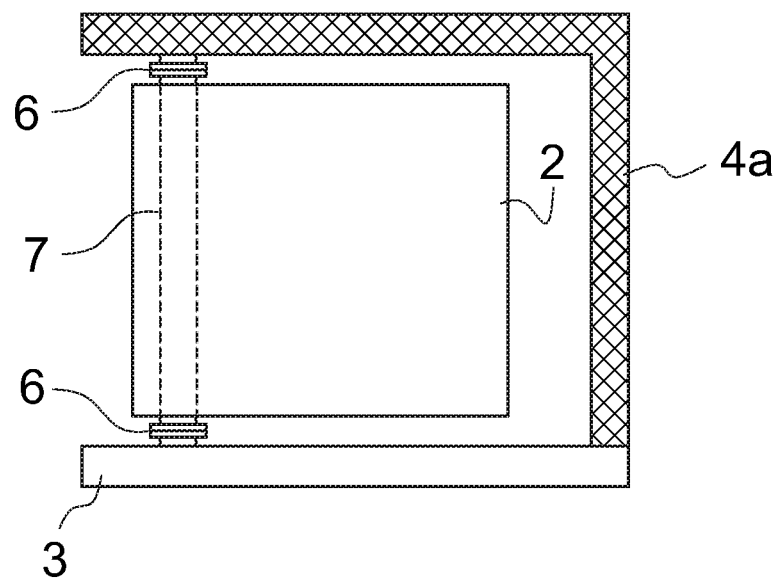
Figure 4:
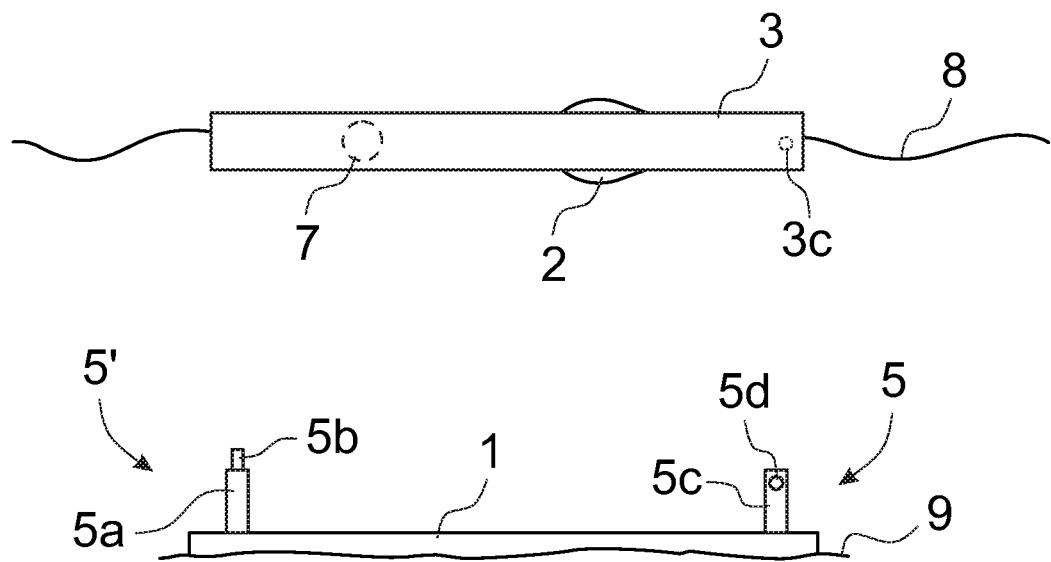
Figure 5:
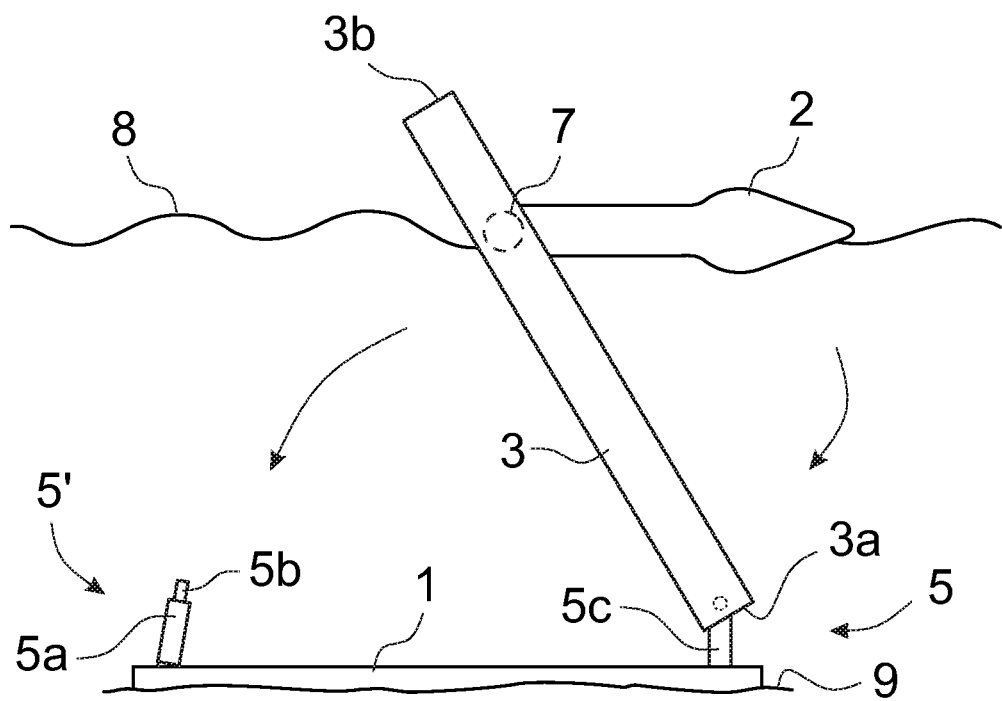
Figure 6:
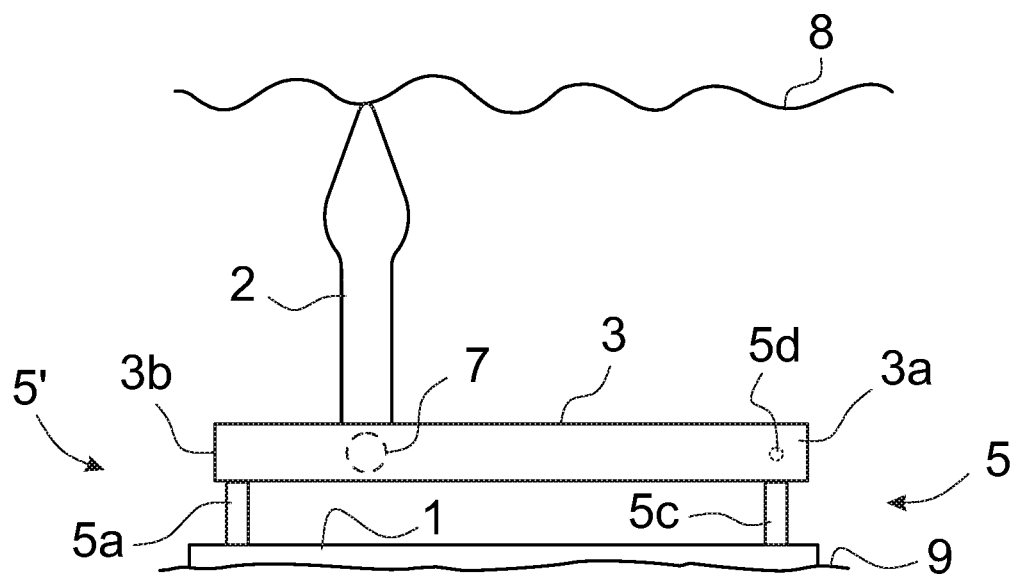
Figure 7:
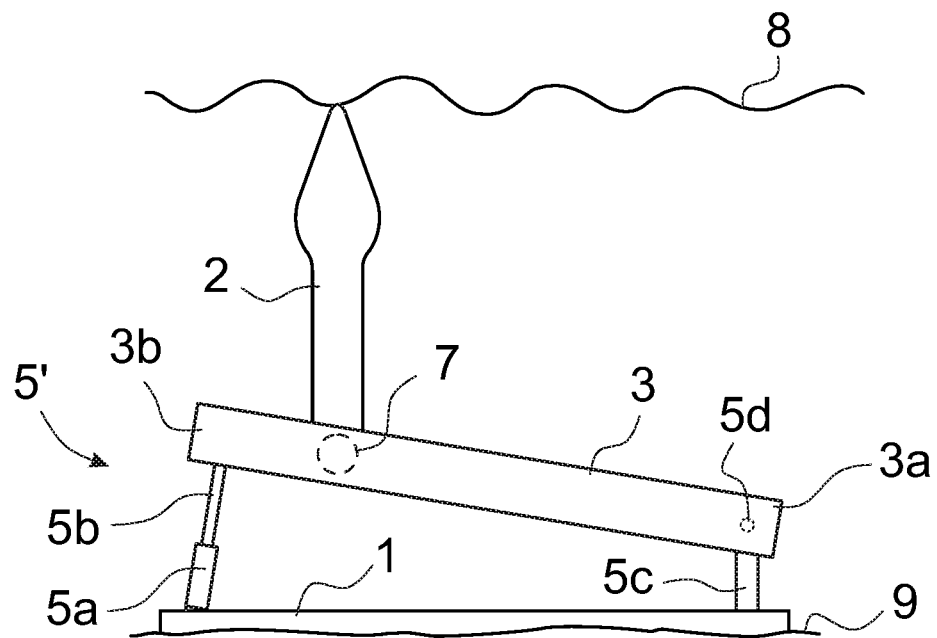
Figure 8:
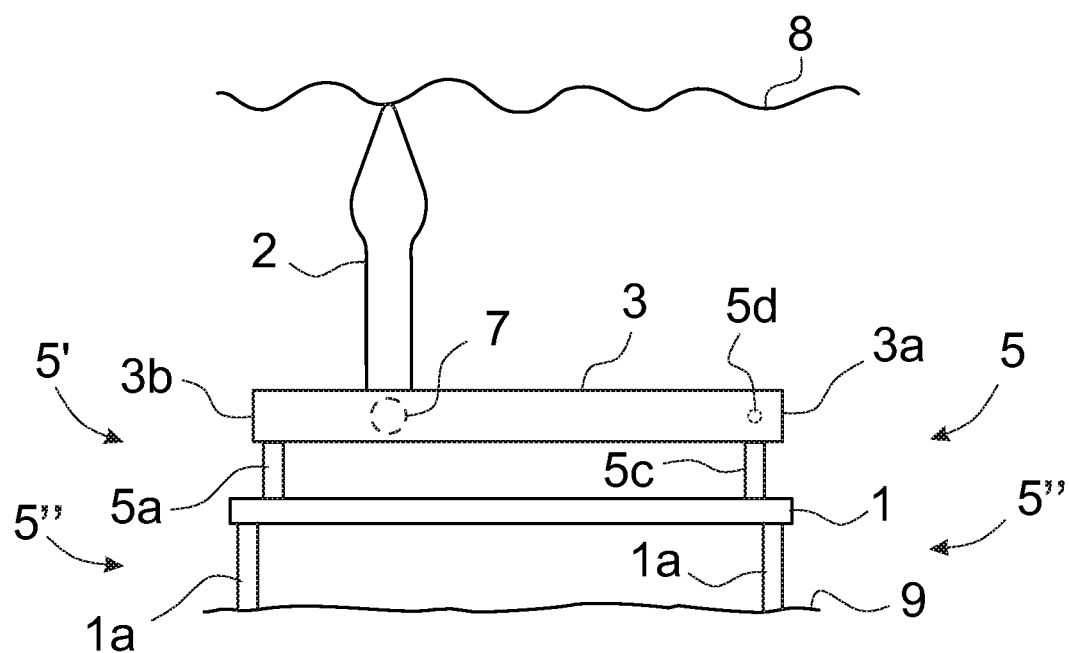
Figure 9:
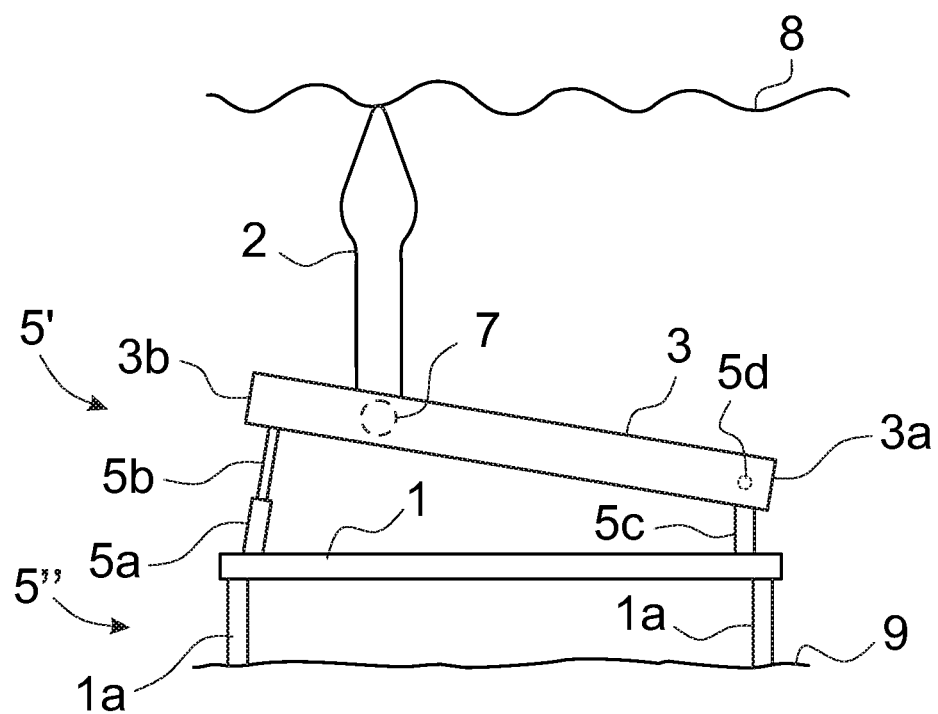
Figure 10:
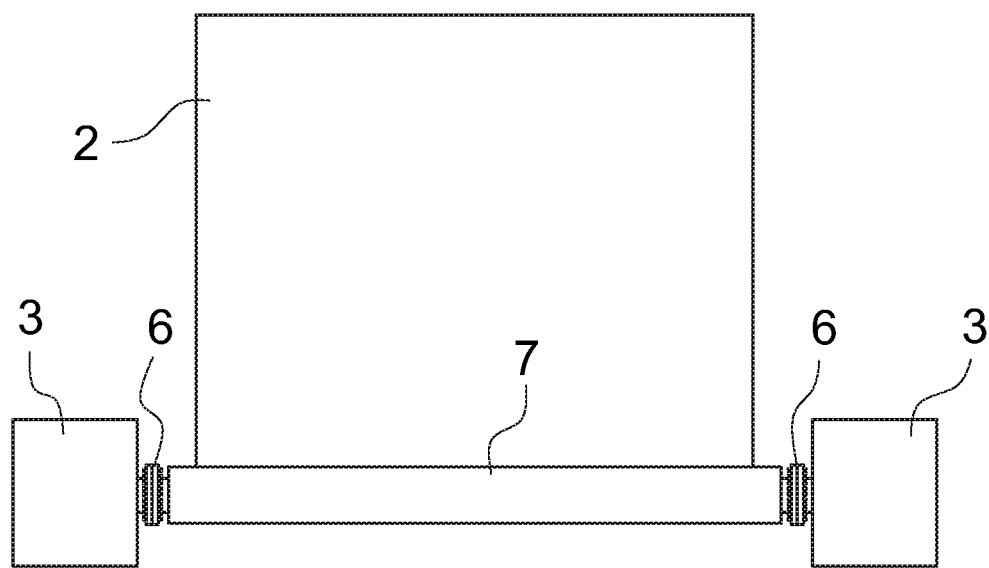
Figure 11:
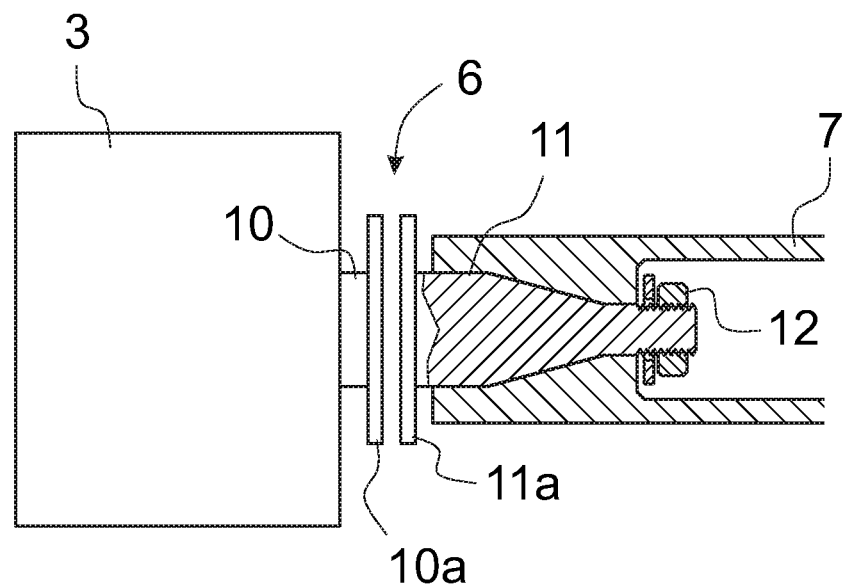
Figure 11A:
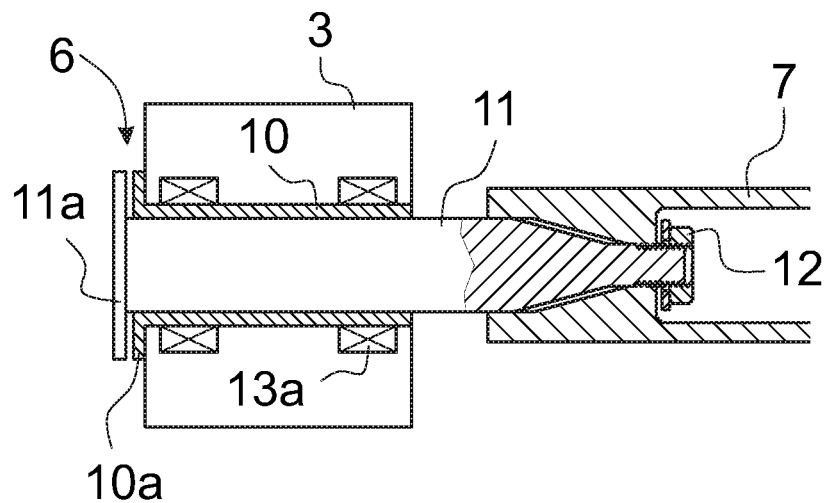
Figure 12:
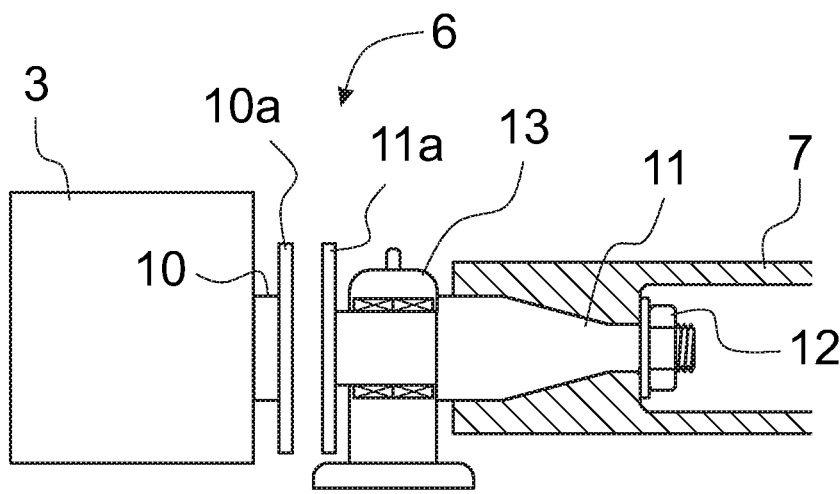
Figure 13:
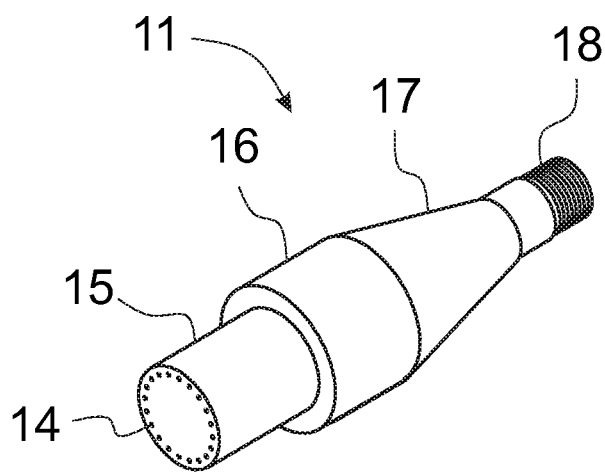
Figure 14:
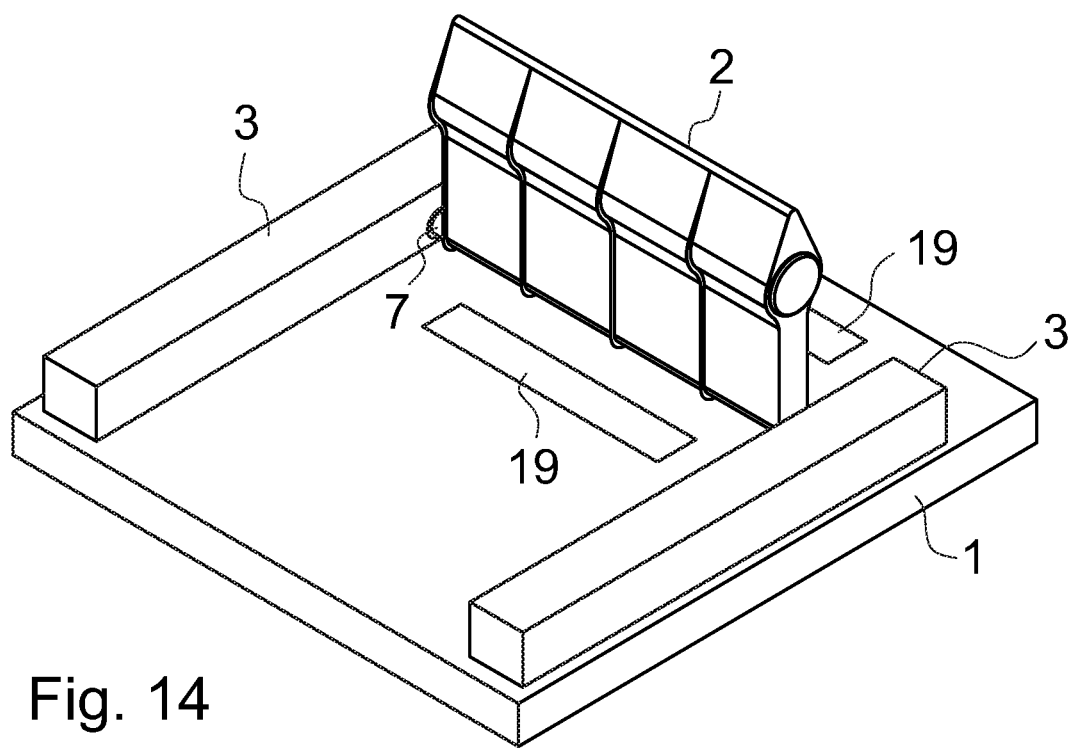
Figure 15:
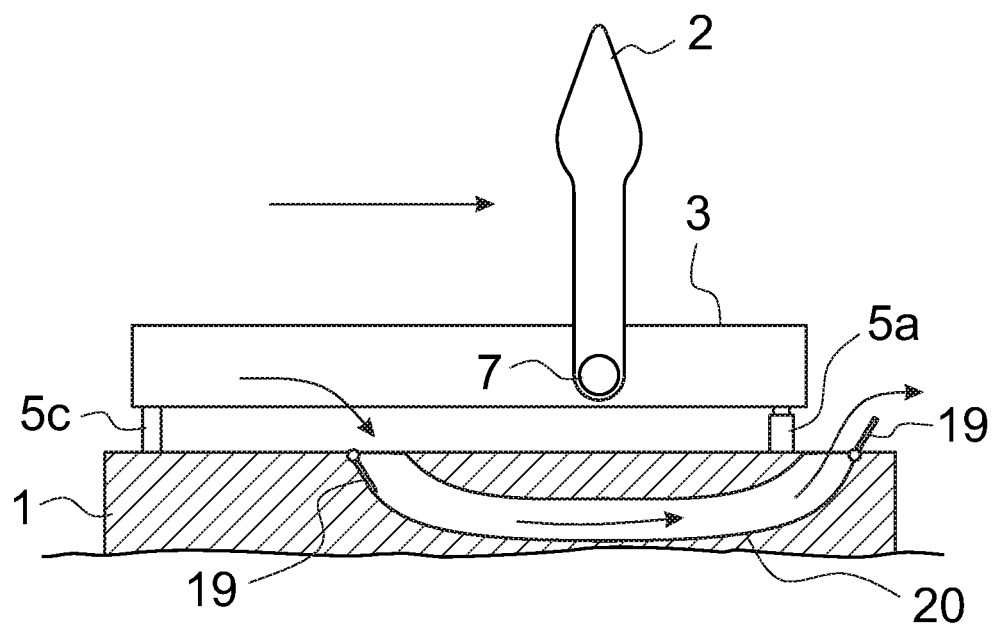
Figure 16:
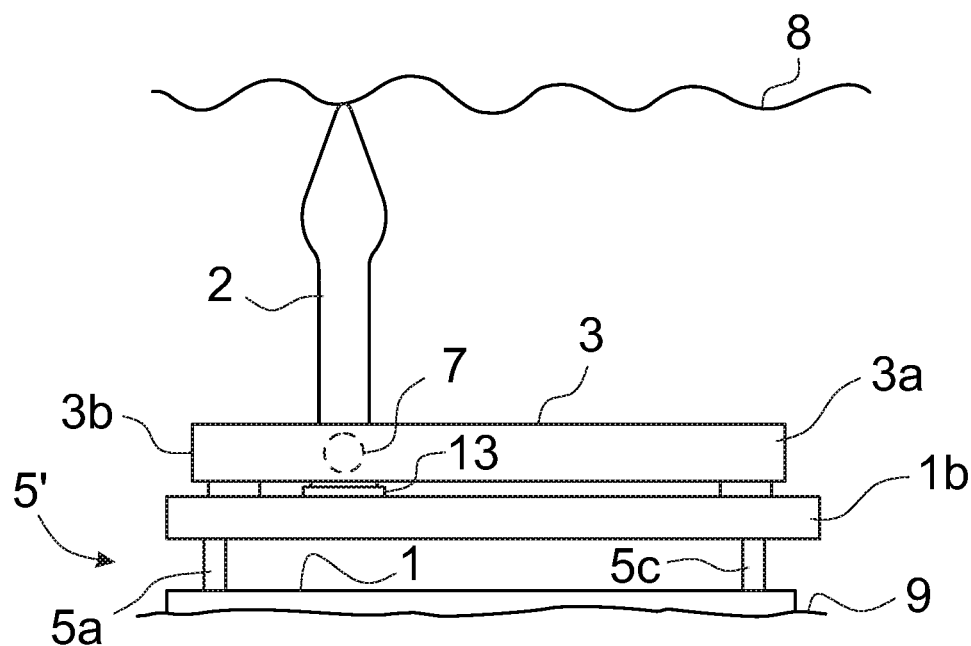
Figure 17:
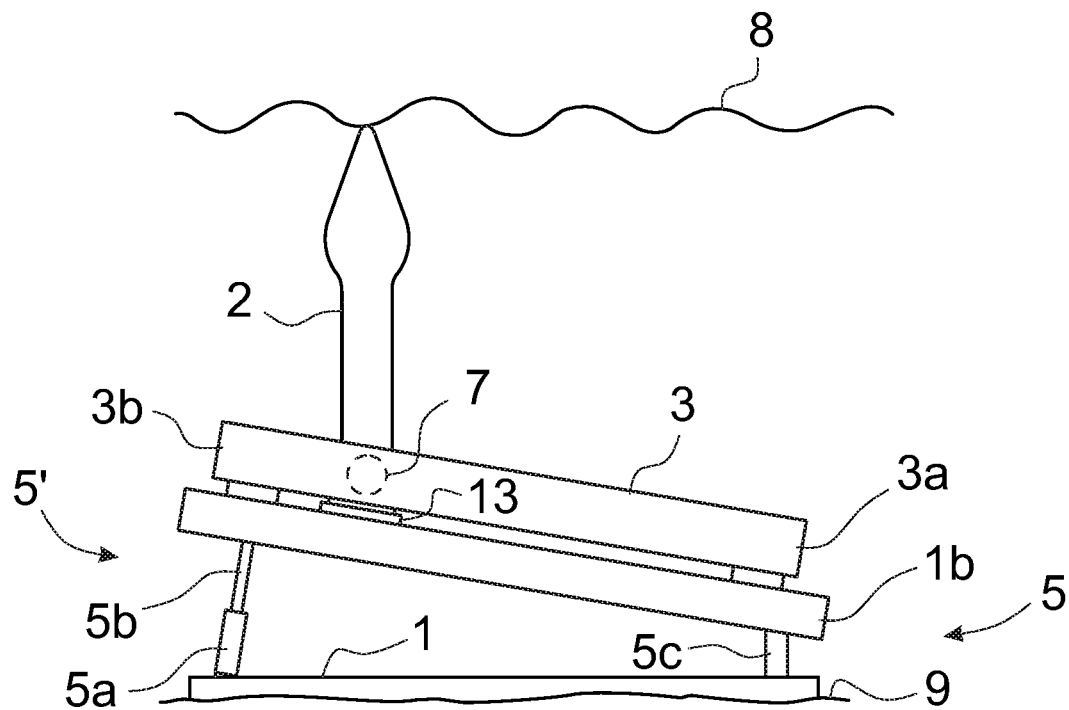

In the following, the invention will be described in detail by the aid of examples by referring to the attached simplified and diagrammatic drawings, wherein FIG. 1 presents a simplified oblique top view of a wave energy recovery arrangement according to the arrangement of the invention, where the apparatus has been installed on a base onto the sea bottom, FIG. 2 presents in a top view and in a simplified and diagrammatic way a wave energy recovery arrangement according to FIG. 1, equipped with two power-take-off units, and the panel being in a horizontal position, FIG. 3 presents in a top view and in a simplified and diagrammatic way another wave energy recovery arrangement according to the invention, equipped with one power-take-off unit, and the panel being in a horizontal position, FIG. 4 presents in a side view and in a simplified and diagrammatic way the arrangement according to the invention, where the heavy gravitational base has been anchored onto the surface of the sea bottom, and the wave recovery apparatus is floating above the base before the final installation, FIG. 5 presents in a side view and in a simplified and diagrammatic way the arrangement according to FIG. 4 in the phase where the end of the wave recovery apparatus is descended onto the bottom of the sea, FIG. 6 presents in a side view and in a simplified and diagrammatic way the arrangement according to FIG. 4 in the situation where the wave recovery apparatus is ready to be used in its lowermost position, FIG. 7 presents in a side view and in a simplified and diagrammatic way the arrangement according to FIG. 4 in the situation where the wave recovery apparatus is ready to be used in its uppermost position, FIG. 8 presents in a side view and in a simplified and diagrammatic way another arrangement according to the invention in the situation where the wave recovery apparatus is ready to be used in its lowermost position, FIG. 9 presents in a side view and in a simplified and diagrammatic way another arrangement according to the invention in the situation where the wave recovery apparatus is ready to be used in its uppermost position, FIG. 10 presents in a front view and in a simplified and diagrammatic way an arrangement according to the invention with one power-take-off unit at both sides of the panel, and the panel equipped with a continuous hollow shaft in its upper edge, FIG. 11 presents in a side view, partially cross-sectioned and in a simplified and diagrammatic way a type of connection according to the invention, which connection is used to connect the panel with the power-take-off unit, FIG. 11a presents in a side view, partially cross-sectioned and in a simplified and diagrammatic way another type of connection according to the invention, which connection is also used to connect the panel with the power-take-off unit, FIG. 12 presents in a side view, partially cross-sectioned and in a simplified and diagrammatic way another type of connection according to the invention, which connection is used to connect the panel with the power-take-off unit, FIG. 13 presents in a simplified oblique top view an auxiliary shaft to connect the panel with the power-take-off unit, FIG. 14 presents a simplified oblique top view of another wave energy recovery arrangement according to the arrangement of the invention, where the apparatus has been installed on a base onto the sea bottom and equipped with an arrangement to guide a part of the water flow to pass the panel, FIG. 15 presents in a side view, partially cross-sectioned and in a simplified and diagrammatic way a wave energy recovery arrangement according to FIG. 14, FIG. 16 presents in a side view and in a simplified and diagrammatic way another arrangement according to the invention in the situation where the wave recovery apparatus is ready to be used in its lowermost position, and FIG. 17 presents in a side view and in a simplified and diagrammatic way the arrangement according to FIG. 16 in the situation where the wave recovery apparatus is ready to be used in its uppermost position.

FIGS. 1 and 2 present a wave energy recovery apparatus according to the arrangement of the invention. FIG. 1 presents the wave energy recovery apparatus in its operating position on the base 1 which is installed onto the bottom of the sea, and FIG. 2 presents the wave energy recovery apparatus from above in its transporting position floating on the surface of the sea.

The wave energy recovery apparatus according to the example comprises a panel 2 reciprocating about its pivot shaft 7 installed on bearings supported by the two power-take-off (PTO) units 3 having a connection mechanism 6 to connect the PTO units 3 to the pivot shaft 7 of the reciprocating panel 2 at both ends of the panel 2. The pivot shaft 7 is at the lower edge of the panel 2 when the panel 2 is in its vertical position. Preferably the pivot shaft 7 is at least as long as the panel 2 is wide. In this way it helps to support the panel 2 and to align the bearings in the same line. The first ends 3a of the PTO units 3 are connected to each other by a connection element 4 that can be for instance a hollow beam. The connection element 4 could be also repeated at the mid length of the PTO units 3 for instance in case that the panel 2 is wider.

The first ends 3a of the PTO units 3 are supported on the base 1 by first adjustment means 5 which are, for instance, support elements whose length is preferably fixed but adjusted to be suitable exactly to the intended production site. The second ends 3b of the PTO units 3 are not connected to each other but supported on the base 1 by second adjustment means 5' which are, for instance, support elements whose length in the axial or vertical direction is arranged to be adjustable. The wave energy recovery apparatus comprises also a supply means to provide the wave energy captured to further use. The supply means may comprise for example electric cables, water pipes, etc.

FIG. 3 presents in a top view and in a simplified and diagrammatic way another wave energy recovery arrangement according to the invention. In this case the wave energy recovery apparatus is equipped with one PTO unit 3 only. In order to achieve a similar support structure as in the apparatus of FIG. 2 the first end 3a of the PTO unit 3 is connected to a rectangular connection element 4a that forms the same kind of a frame as in the structure of FIG. 2, where the first end of the connection element 4a connected with the first end 3a of the PTO unit 3 and the second end of the connection element 4a connected with the pivot shaft 7 or its extension. Also this type of the wave energy recovery apparatus comprises a connection mechanism 6 to connect the pivot shaft 7 of the reciprocating panel 2 at both ends of the panel 2 with both the PTO unit 3 and the second end of the connection element 4a. In this wave energy recovery apparatus the connection element 4a can also be a hollow beam.

FIGS. 4-9 present the wave energy apparatus according to the arrangement of the invention in four different situations, from the beginning of the installation to the final working situation when the tide is at its highest point. All the main parts, such as the panel 2, PTO units 3, connection elements 4, 4a and the pivot shaft 7 of the wave recovery apparatus can be hollow or equipped with pontoons so that the whole wave recovery apparatus can float on the surface 8 of the sea.

FIG. 4 presents the situation where the wave recovery apparatus has brought to its production site and is floating on the surface 8 of the sea above the base 1 that is pre-installed onto the sea bottom 9. The first end of the base 1 is equipped with the first adjustment means 5 which comprise, for instance, first support elements 5c whose length in the axial or vertical direction is fixed, and which first support elements 5c are equipped with hinge elements 5d which are designed to be pivotally connected to the connection point 3c at the first end of each PTO unit 3.

Correspondingly the second end of the base 1 is equipped with the second adjustment means 5' which comprise, for instance, second support elements 5a whose length in the axial or vertical direction is adjustable. For that purpose the second support elements 5a are equipped with extendible elements 5b, such as piston rods, rack and pinion, or rotating threaded bar, which are designed to be connected to the second ends of the PTO units 3.

FIG. 5 presents the situation where the first end of the wave recovery apparatus is descended to its production site onto the bottom 9 of the sea. The dimensioning of the arrangement is arranged so that the distance between the surface 8 of the water and the adjustment means 5 and/or 5' of the base 1 is such that the first end 3a of the PTO unit 3 or the corresponding point of the connection element 4, 4a reaches to the fastening and hinge point 5d of the first support elements 5c at the same time when the panel 2 still floats on the surface 8 of the water. It can also be mentioned that the distance from the centerline of the pivot shaft 7 to the connection point 3c is equal or greater than the distance from the surface 8 of the water to the hinge point 5d. And it can also be noticed that as far as a realistic depth the deeper the water the longer the support elements 5a and 5c can be.

However, if the depth of the water is so great that the length of the support elements 5a and 5c cannot be realistically increased the base 1 cannot be installed directly onto the bottom 9 of the sea but the base 1 has to be installed on separate adjustment means 5" that comprise, for instance, support legs 1a that are fastened to the bottom 9 of the sea. The length of the support legs 1a can be varied so that the base 1 can be installed always at the correct distance from the surface 8 of the water regardless of the depth of the water at the production site. FIGS. 8 and 9 present that kind of a situation. In that case the heavy gravitational base 1 is replaced with lighter concrete or steel frame base 1. Also other solutions to install the base 1 at a certain height can be used.

The correct dimensioning makes the servicing or maintenance also easier and more cost effective. For the maintenance only the second end of the apparatus must be unfastened from the second adjustment means 5' and the PTO units 3 can be turned upwards into about a vertical position around the hinge points 5d. After that the panel 2 floats on the surface 8 of the water as shown, for instance in FIG. 5. If that is not enough for the maintenance the first end of the PTO units 3 can also be unfastened from the first adjustment means 5 and the first end of the PTO units 3 can be ascended to the surface 8 of the water. The situation then corresponds what is shown in FIG. 4.

As mentioned above in the situation of FIG. 5 the first end of the wave energy apparatus has been descended down to the water and connected pivotally to its fastening points with the first support elements 5c and the hinge elements 5d. The panel 2 is still floating on the surface 8 of the water and is supporting the second ends 3b of the PTO units 3 or the connection element 4a about on the surface 8 of the water. After the first end of the apparatus is fastened to the first support elements 5c the second end of the apparatus is also descended down to water and fastened with the second support elements 5a through the extendible elements 5b. At the same time the pivot shaft 7 and the panel 2 descent also into the water.

FIG. 6 presents the situation where the wave energy recovery apparatus has been installed onto its production site and is functioning in a normal way in the situation of a low tide. The second adjustment means 5' are in their lowermost positions and the top of the upper part of the panel 2 reaches in its vertical position to just about the surface 8 of the water.

FIG. 7 presents the situation where the wave energy recovery apparatus is functioning in a normal way in the situation of a high tide. The second adjustment means 5' are in their uppermost positions and the top of the upper part of the panel 2 reaches again in its vertical position to just about the surface 8 of the water. The length adjustment of the second adjustment means 5' can be made in different ways. For instance, the arrangement comprises monitoring means 102 or follow-up means to follow the height position or altitude of the surface 8 of the water substantially continuously and when the height of the water increases the monitoring means instructs, through the control system 100 of the apparatus, the second adjustment means 5' to extend the length of the second support elements 5a by pushing the extendible elements 5b outwards from the cylinder part of the support elements 5a, which causes the panel 2 to ascend towards the surface 8 of the water preferably the same travel as the water has ascended, and vice versa when the height of the water decreases. Then the monitoring means 102 instructs, through the control system 100 of the apparatus, the second adjustment means 5' to pull the extendible elements 5b inwards to the cylinder part of the support elements 5a, which causes the panel 2 to descend towards the bottom of the sea. The control system 100 and monitoring mean 102 are shown in FIG. 1.

The solution according to FIGS. 8 and 9 is otherwise the same as the solution according to FIGS. 4-7 but the base 1 has been installed at a certain height between the surface 8 of the water and the bottom 9 of the sea. The correct height position of the base 1 can be achieved in different ways. Here it has been done with separate support legs 1a that act as fixed adjustment means 5", but the base 1 could also be floating and anchored to the bottom 9 of the sea at a wanted altitude level between the surface 8 of the water and the bottom 9 of the sea.

FIGS. 10-13 present different connections between the pivot shaft 7 of the panel 2 and the PTO units 3. These connections are special connections which are arranged to make it possible to use the second adjustment means 5' to set or move the top of the panel 2 in its vertical position to approximately correspond the altitude of the surface 8 of the water in all situations. It is preferable that related to the adjustment of the height position of the panel 2 each PTO unit 3 moves upwards and downwards along with the panel 2. That is why the proper connection with the pivot shaft 7 of the panel 2 and each PTO unit 3 is significant.

One advantageous way to connect the pivot shaft 7 of the panel 2 to the PTO unit 3 is to make the pivot shaft 7 hollow and substantially as long as the width of the panel 2, and to fasten the pivot shaft 7 at a lower edge of the panel 2. That kind of solution maintains the stiffness of the pivot shaft 7 and its bearings. In order to make the apparatus easy to install and easy to take for maintenance it is preferable to place a separate connection shaft 11 between the pivot shaft 7 and the input shaft 10 of the PTO unit 3. In the solutions according to FIGS. 10, 11 and 11a the main bearings 13a of the panel 2 are inside the PTO 3 on the input shaft 10, whereas in the solution of FIG. 12 the main bearing 13 is between the pivot shaft 7 and the PTO 3 on the connection shaft 11. Regardless of the cylindrical part 15 for the main bearing 13 the connection shaft 11 can be about similar in all the solutions. The connection shaft 11 and the input shaft 10 of the PTO unit 3 are connected together with the connection mechanism 6 that comprises, for instance two adjacent connection flanges 10a, 11a that are bolted together. The first connection flange 10a is at the end of the input shaft 10 of the PTO unit 3 outside the PTO unit 3, and the second connection flange 11a is at the first end of the connection shaft 11 outside the first end of the pivot shaft 7.

In the solution of FIG. 11a the connection shaft 11 is pushed through the PTO unit 3 into the pivot shaft 7 so that the connection mechanism 6 is arranged at the opposite side of the PTO unit 3 than the panel side. In that case the input shaft 10 of the PTO unit 3 is hollow and the connection shaft 11 is installed through the input shaft 10. The solution of the hollow input shaft 10 makes the easier installation possible. In that case the panel 2 and the PTO unit 3 can be first placed side by side without the connection shaft 11, and after that the connection shaft 11 can be pushed into its location through the input shaft 10 of the PTO unit 3. That kind of the structure also improves fatigue durability.

The flanges 10a, 11a can be complemented or replaced with different kinds of connection mechanisms, for example with axial grooves and counter grooves or axial teeth and counter teeth on the periphery or outer circle of the shafts 10 and 11, or with other suitable solutions. In case of the solution of FIG. 11a the axial connection grooves and/or teeth of the input shaft 10 are on the inner circle of the input shaft 10 and the counter grooves or teeth on the periphery or outer circle of the connection shaft 11.

The second end of the connection shaft 11 comprises threads 18 for a tightening element 12, such as a nut, by which the connection shaft 11 is tightened at its place in the both ends of the hollow pivot shaft 7. In addition the connection shaft 11 comprises a conical part 17 that matches with a conical counterpart at the end of the pivot shaft 7. The conical part 17 makes the sufficient tightening possible when the tightening element 12 is used. Further the connection shaft 11 comprises a first cylindrical part 16 and a second cylindrical part 15 when the bearing solution according to FIG. 12 is used. Finally the first end of the connection shaft 11 comprises threaded holes 14 for fastening the second flange 11a to the end of the connection shaft 11. The form and parts of the connection shaft 11 can vary depending on the mechanical structures between the end of the pivot shaft 7 and the PTO 3.

The hollow pivot shaft 7 also works as a flooding tank. Any leaks in the upper buoyancy tank of the panel 2 are lead down to this lower tank and thus loads due to possible accidental flooding can be reduced. The arrangement can also comprise a water alarm system to give an early warning for leakages in the buoyancy tank. This arrangement gives time to plan a recovery during a safe weather window.

FIGS. 14 and 15 present another wave energy recovery arrangement according to the arrangement of the invention. In this case the wave energy recovery apparatus has been installed on a thicker base 1 onto the sea bottom and equipped with an arrangement to guide a part of the water flow to pass the panel 2. The base 1 comprises a channel 20 that is guided to run underneath the panel 2 so that the first end of the channel 20 is in the front side of the panel 2 and the second end of the channel 20 is in the back side of the panel 2. Both the ends of the channel are equipped with a hinged hatch 19 that can be opened and closed. Preferably the hatches 19 are closed with spring mechanisms that are not shown in the figures, and the hatches 19 are arranged to open by the pressure of water against the hatches 19. In normal situations the spring mechanisms keep the hatches 19 closed but in the stormy conditions when the pressure of water is high the pressure outdoes the spring force and the first hatch 19 that is in front of the panel 2 in the direction of water flow turns down to open the channel 20 as is shown in FIG. 15. Then the water pressure in the channel 20 pushes the second hatch 19 that is behind the panel 2 in the direction of water flow open and the excess water flow can pass the panel 2. The same works also in the opposite direction, if needed, but usually the water flow from the direction of the shore is not so strong that the passing of water flow would be needed. The arrangement can also comprise actuators by which the hatches 19 are opened instead of the opening that takes place by the pressure of water.

FIGS. 16 and 17 present another arrangement according to the invention in the situations where the wave recovery apparatus is in its lowermost position and its uppermost position. These situations correspond to situations explained in connection with FIGS. 6 and 7 but now the structure of the arrangement is different. In this solution the main bearings 13 of the pivot shaft 7 are between the PTO units 3 and the pivot shaft 7 as shown in FIG. 12. In that case the arrangement needs an intermediate structure 1b onto which the main bearings 13 are supported. The intermediate structure 1b can be a solid plate-like base or it may comprise, for instance, two separate support beams that are supported by the adjustment means 5 and 5' and which base or support beams themselves support the main bearings 13. This solution makes it possible to use main bearings 13 outside the PTO units 3, and at the same time the follow-up of the surface of the water is possible during the variations of the tide.

It is common to all of the embodiments of the invention that the panel 2 is installed on the base 1 so that the variation of the height or altitude of the water surface, for example during the low and high tide can be followed and the vertical position of the panel 2 can adjusted according the height of the water surface so that the recovery capacity is all the time as efficient as possible.

It is obvious to the person skilled in the art that the invention is not restricted to the examples described above but that it may be varied within the scope of the claims presented below. Thus, for example, the structure of the arrangement can be different from what is presented.

The invention claimed is:

1. Arrangement in a wave energy recovery apparatus comprising at least a base, on which a reciprocating panel is installed, a pivot shaft for the reciprocating panel, a control system, and one or more power-take-off (PTO) units to convert kinetic energy of waves or tidal currents to another type of energy, and the arrangement also comprises adjustment means to set the top of the reciprocating pane in its vertical position to approximately correspond to the altitude of a surface of the water, characterized in that a first end of each PTO unit is connected pivotally to a first adjustment means and a second end of each PTO unit is connected to an extendible element of a second adjustment means, and that the axial length of the second adjustment means is adjustable by the extendible element.

2. Arrangement in a wave energy recovery apparatus according to claim 1, characterized in that the arrangement comprises monitoring means to watch the altitude of the surface of the water, which the monitoring means are connected at least to the adjustment means to make the top of the reciprocating panel in its vertical position to follow the altitude of the surface of the water when the altitude varies between low and high tide.

3. Arrangement in a wave energy recovery apparatus according to claim 1, characterized in that the reciprocating panel together with each PTO unit is supported on the base by the adjustment means.

4. Arrangement in a wave energy recovery apparatus according to claim 1, characterized in that the height position of the reciprocating panel is arranged to be adjusted by moving the reciprocating panel and one end of each PTO unit substantially simultaneously upwards and downwards.

5. Arrangement in a wave energy recovery apparatus according to claim 1, characterized in that the dimensioning of the arrangement is arranged so that a distance between the surface of the water and the first adjustment means on the base is such that the first end of the PTO unit or the corresponding point of a connection element connected to the PTO unit reaches to fastening and hinge point of the first adjustment means at the same time when the reciprocating panel still floats on the surface of the water.

6. Arrangement in a wave energy recovery apparatus according to claim 5, characterized in that a distance from the centerline of the pivot shaft to a connection point in the apparatus is equal or greater than a distance from the surface of the water to the fastening and hinge point on the base.

7. Arrangement in a wave energy recovery apparatus according to claim 1, characterized in that the reciprocating panel is connected to each PTO unit with a separate connection shaft the pivot shaft and an input shaft of the PTO unit.

8. Arrangement in a wave energy recovery apparatus according to claim 7, characterized in that the connection shaft comprises a conical part that is arranged to match with a conical counterpart at an end of the pivot shaft and that is arranged to be tightened into the pivot shaft with tightening element.

9. Arrangement in a wave energy recovery apparatus according to claim 7, characterized in that the connection shaft and the input shaft of the PTO unit are connected together with a connection mechanism that comprises two adjacent connection flanges that are fastened together.

10. Arrangement in a wave energy recovery apparatus according to claim 1, characterized in that main bearings of the pivot shaft are inside each PTO unit or between each PTO unit and each end of the pivot shaft.

11. Arrangement in a wave energy recovery apparatus according to claim 1, characterized in that the base comprises a channel that is guided to run underneath the panel so that a first end of the channel is in a front side of the panel and a second end of the channel is in a back side of the panel, and that both the ends of the channel are equipped with a hinged hatch that is openable and closable.

12. Arrangement in a wave energy recovery apparatus according to claim 11, characterized in that the arrangement comprises spring mechanisms that are arranged to keep the hinged hatches closed in normal weather conditions and to let the hinged hatches open when the pressure of water outdoes the spring force.

13. Arrangement in a wave energy recovery apparatus according to claim 1, characterized in that the arrangement comprises main bearings of the pivot shaft between each PTO unit and each end of the pivot shaft, and an intermediate structure onto which the main bearings are supported, and which intermediate structure is supported between the base and each PTO unit by the adjustment means.

14. A method for operating a wave energy recovery apparatus comprising at least a base, on which a reciprocating panel is installed, a pivot shaft for the reciprocating panel, a control system, and one or more power-take-off (PTO) units to convert kinetic energy of waves or tidal currents to another type of energy, and the top of the reciprocating panel in its vertical position is set to approximately correspond to the altitude of a surface of the water by adjusting the altitude of the reciprocating panel with adjustment means, characterized in that during the installation phase the reciprocating panel with each PTO unit are let to float on the surface of the water approximately above the pre-installed base, and the method comprises at least the steps as follows:

while the reciprocating panel, and each PTO unit are floating on the surface of the water a first end of the wave recovery apparatus is descended to its production site and connected pivotally to hinge points of a first adjustment means, thereafter a second end of the wave recovery apparatus with the reciprocating panel are descended to their production site and the second end of the wave recovery apparatus is connected to extendible elements of a second adjustment means so that the second end of the wave recovery apparatus is movable towards the surface of the water and back towards the bottom of the sea.

15. The method for operating a wave energy recovery apparatus according to claim 14, characterized in that the altitude of the surface of the water is monitored with monitoring means, and with the help of data received from the monitoring means the altitude of the top of the reciprocating panel in its vertical position is placed to approximately correspond to the moving altitude of the surface of the water by ascending the reciprocating panel with the adjustment means when the surface of the water is ascending, and descending the reciprocating panel with the adjustment means when the surface of the water is descending.

16. The method for operating a wave energy recovery apparatus according to claim 14, characterized in that the height position of the reciprocating panel is adjusted by moving the reciprocating panel and one end of each PTO unit substantially simultaneously upwards and downwards continuously and substantially in the same rhythm and into the same direction with the alteration of the surface of the water.

17. The method for operating a wave energy recovery apparatus according to claim 14, characterized in that when taking the wave recovery apparatus into servicing or maintenance, the second end of the wave recovery apparatus is unfastened from the second adjustment means and the second end of the wave recovery apparatus with the reciprocating panel are ascended to the surface of the water, wherein the first end of the wave recovery apparatus remains connected to the hinge points of the first adjustment means.

18. The method for operating a wave energy recovery apparatus according to claim 14, characterized in that when taking the wave recovery apparatus into servicing or maintenance, the second end of the wave recovery apparatus is unfastened from the second adjustment means and the second end of the wave recovery apparatus with the reciprocating panel are ascended to the surface of the water, and thereafter the first end of the wave recovery apparatus is unfastened from the first adjustment means and ascended to the surface of the water.

* * * * *

UNITED STATES PATENT AND TRADEMARK OFFICE
CERTIFICATE OF CORRECTION

PATENT NO. : 10,619,619 B2
APPLICATION NO. : 16/091871
DATED : April 14, 2020
INVENTOR(S) : Arvo Jarvinen et al.

Page 1 of 1

It is certified that error appears in the above-identified patent and that said Letters Patent is hereby corrected as shown below:

In the Specification

Column 8, Line 48, "pane" should be --panel--

Column 9, Line 23, "shaft the pivot shaft" should be --shaft between the pivot shaft--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*